United States Patent
Johansson et al.

(10) Patent No.: US 9,497,760 B2
(45) Date of Patent: Nov. 15, 2016

(54) ALLOCATING BASEBAND RESOURCE CAPACITY TO CELLS BASED ON BASEBAND PROCESSING DEADLINE MARGINS

(71) Applicant: Telefonaktiebolaget L M Ericsson (publ), Stockholm (SE)

(72) Inventors: Peter Johansson, Solna (SE); Mats Johansson, Spånga (SE); Tomas Lagerqvist, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

(21) Appl. No.: 14/553,020

(22) Filed: Nov. 25, 2014

(65) Prior Publication Data

US 2016/0150531 A1    May 26, 2016

(51) Int. Cl.
*H04W 72/00*    (2009.01)
*H04W 72/04*    (2009.01)

(52) U.S. Cl.
CPC ............................ *H04W 72/0446* (2013.01)

(58) Field of Classification Search
CPC ............. H04W 72/0446; H04W 24/00; H04W 72/082; H04W 16/10
USPC ....................................... 455/452.1; 370/338
See application file for complete search history.

(56) References Cited

U.S. PATENT DOCUMENTS

| | | | |
|---|---|---|---|
| 2009/0149221 A1* | 6/2009 | Liu | ...................... H04W 88/085 455/561 |
| 2011/0310810 A1 | 12/2011 | Kenington et al. | |
| 2014/0056224 A1 | 2/2014 | Rubin et al. | |

FOREIGN PATENT DOCUMENTS

| | | |
|---|---|---|
| EP | 1 713 290 A1 | 10/2006 |
| EP | 2 595 441 A1 | 5/2013 |
| WO | WO 2013/072108 A1 | 5/2013 |

OTHER PUBLICATIONS

International Search Report and Written Opinion of the International Searching Authority, Application No. PCT/SE2014/051411, Sep. 14, 2015.

* cited by examiner

*Primary Examiner* — Marcos Batista
(74) *Attorney, Agent, or Firm* — Myers Bigel, P.A.

(57) ABSTRACT

Methods by a radio unit and related radio units are disclosed which control capacity of baseband processing resources allocated to a radio communication cell. The method includes determining a deadline margin for a prior transmission time interval (TTI) based on a difference between a time when baseband processing of data for transmission completed and a defined deadline time for completion of the baseband processing. The method further includes determining a desired capacity of baseband processing resources to allocate to the radio communication cell for a present TTI, and controlling capacity of baseband processing resources allocated to the radio communication cell for the present TTI based on the deadline margin and the desired capacity.

22 Claims, 5 Drawing Sheets

ALLOCATING BASEBAND RESOURCE CAPACITY TO CELLS BASED ON BASEBAND PROCESSING DEADLINE MARGINS

TECHNICAL FIELD

The present invention relates to communications networks. More particularly, and not by way of limitation, the present invention is directed to methods and radio nodes controlling capacity of baseband processing resources allocated to radio communication cells.

BACKGROUND

The baseband processing resource capacity of a 3rd Generation Partnership Project (3GPP) Long Term Evolution (LTE) baseband processing unit can be defined using the following capabilities: maximum throughput, maximum number of scheduled entities (SE) per transmission timing interval (TTI), maximum number of scheduled physical resource blocks (PRBs), and maximum number of connected user equipments (UEs).

Baseband processing component can be deployed according to either a one-to-one mapping of one baseband processing component to one cell or a pooled approach mapping several cells to one baseband processing component. In the one-to-one mapping approach, a separate baseband processing component is deployed for each radio communication cell. In this approach it is relatively easy to determine the baseband processing resource capacity limits since the number of different deployments is limited and the baseband processing resource capacity in one cell is independent of the baseband processing resource capacity in other cells. The baseband processing resource capacity limits can be defined based on a number of defined constants that set the baseband processing capacity for the cell.

In the pooled approach, one baseband processing component serves a plurality of radio communication cells. An advantage of the pooled approach is that the resource capacity of the baseband processing component does not need to be dimensioned for the peak load of each of the cells. This enables a pooling gain compared to the one-to-one mapping approach where the resource capacity of the baseband processing component is dimensioned for the peak load in each cell. In the pooled approach, the resource capacity of the baseband processing component is defined by not only a number of constants per cell, but moreover by another set of constants defining the capacity per baseband processing component, i.e. the capacity for one cell is dependent on the capacity utilized in the other cells served by the baseband processing component.

The pooled approach can be difficult to manage to set constants that limit the baseband processing resource capacity allocated to the pool of radio communication cells. Different customers can use different deployments and the traffic scenarios throughout a day will vary. One customer may map few cells per baseband processing component, and another customer may map a large number of cells per baseband processing component. Sometime during a day there may be very few active UEs connected to a radio unit (e.g., eNodeB) in one of the cells. At that time the demand for scheduling entities will be low, but the demand for PRBs and throughput can be high while the few active UEs have high traffic demands.

Two alternative approaches can be considered for allocating baseband processing resource capacity based on all of the different deployments and traffic scenarios. In one approach, the allocation is performed assuming that the worst case loadings occur at the same time, i.e., the maximum number of cells served by the baseband processing component, maximum number of radio resource control (RRC) connect users, maximum number of scheduling entities, maximum throughput, and maximum number of scheduled PRBs. This approach will lead to very low capacity utilization in many deployments and traffic scenarios.

In one approach, the allocation is performed assuming different capacity limits are set dependent on traffic scenarios and deployment. This approach will lead to a large amount of capacity thresholds that will be very hard to maintain and verify.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Various embodiments of the present invention are directed to controlling capacity of baseband processing resources allocated to radio communication cells.

One embodiment is directed to a method by a radio unit for controlling capacity of baseband processing resources allocated to a radio communication cell. The method includes determining a deadline margin for a prior transmission time interval (TTI) based on a difference between a time when baseband processing of data for transmission completed and a defined deadline time for completion of the baseband processing. The method further includes determining a desired capacity of baseband processing resources to allocate to the radio communication cell for a present TTI, and controlling capacity of baseband processing resources allocated to the radio communication cell for the present TTI based on the deadline margin and the desired capacity.

Another embodiment is directed to a corresponding radio unit for controlling capacity of baseband processing resources allocated to a radio communication cell. The radio unit includes at least one processor and at least one memory. The memory is coupled to the processor and includes computer readable program code that when executed by the at least one processor causes the at least one processor to perform operations. The operations include determining a deadline margin for a prior TTI based on a difference between a time when baseband processing of data for transmission completed and a defined deadline time for completion of the baseband processing. The operations further include determining a desired capacity of baseband processing resources to allocate to the radio communication cell for a present TTI, and controlling capacity of baseband processing resources allocated to the at least one of the radio communication cell for the present TTI based on the deadline margin and the desired capacity.

Potential advantage of one or more of the embodiments disclosed herein is that the capacity targets will adapt to the current deployment and presently observed communication traffic. This can enable higher capacity and less tuning of constants used to set capacity limits. Baseband processing resources may be more efficiently utilized and the capacity of cells serviced by the baseband processing resources can be more effectively managed.

Other methods and radio units according to embodiments of the invention will be or become apparent to one with skill in the art upon review of the following drawings and detailed description. It is intended that all such additional methods and radio units be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

LTE technologies and algorithms, such as orthogonal frequency-division multiplexing (OFDM) and multiple-input and multiple-output (MIMO) are complex and require significantly more computational resources than the technologies and algorithms of previous 3GPP standards. In LTE there is a baseband processing deadline time when all baseband processing of data for transmission must be finished in order to satisfy further requirements for transmitting data at a scheduled time from an antenna reference point, e.g., a radio node. If a radio node does not complete the baseband processing of data before the baseband processing deadline time, then the data is discarded without being transmitted.

In at least some embodiments of the present disclosure, a radio node monitors a deadline margin for a prior transmission time interval (TTI) based on a difference between a time when baseband processing of data for transmission completed and a defined deadline time for completion of the baseband processing. The radio node controls capacity of baseband processing resources allocated to one or more radio communication cells based on the deadline margin. A potential advantage of this approach is that the capacity targets will adapt to the current deployment and presently observed communication traffic. This can enable higher capacity and less tuning of constants used to set capacity limits.

Example Communications System

Figure 1:
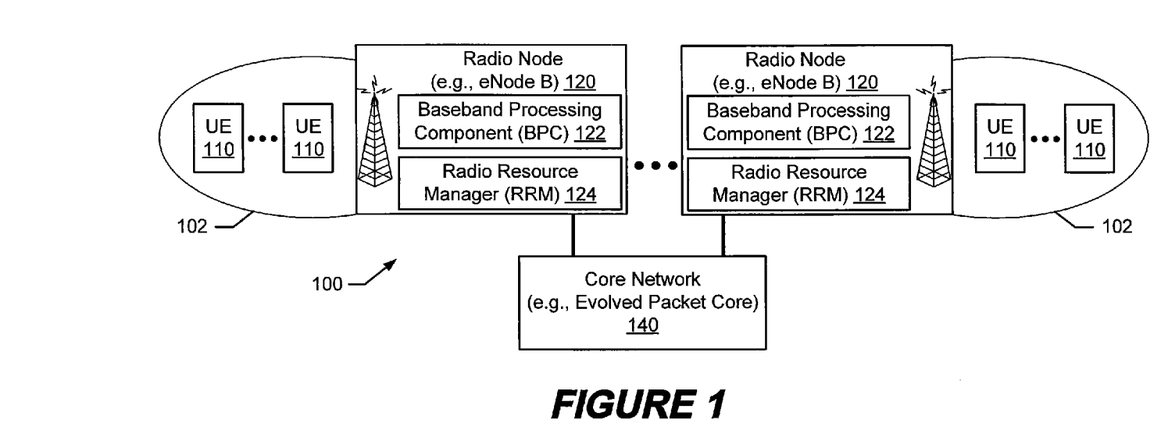
FIG. 1 is a block diagram of a communications system that controls capacity of baseband processing resources allocated to a radio communication cell in accordance with some embodiments of the present disclosure.

FIG. 1 is a block diagram of a communications system 100 that controls capacity of baseband processing resources allocated to radio communication cells 102 in accordance with some embodiments of the present disclosure. The system 100 includes radio nodes 120 that provide radio communication cells 102 serving user equipments (UEs) 110.

Examples of a radio node 120 include, without limitation, an E-UTRAN Node B or Evolved Node B or eNodeB, a Node a base station (BS), a multi-standard radio (MSR) node, a base transceiver station (BTS), an access point (AP), a transmission point, a remote radio head, a remote radio unit, a node in a distributed antenna system (DAS), etc. A UE 110 can include, without limitation, any type of wireless device configured for communicating with the radio node 120. The radio node 120 is connected to a core network 140, which may be an Evolved Packet Core including a mobility management entity, policy control and charging rules function, etc.

Nonlimiting examples of a UE 110 include a personal data assistant, a portable computer, a tablet computer, a video game console, a device capable of device-to-device (D2D) communication, a device capable of machine-to-machine (M2M) communication, a USB dongle, etc.

The radio nodes 120 include a baseband processing component (BPC) 122 that performs baseband processing of data in preparation for transmission. In some embodiments, baseband processing of data by the baseband processing component 122 can include any or more of: cyclic redundancy check (CRC) coding of data; bit scrambling; turbo encoding; sub-block interleaving; rate matching; and Physical Uplink Control Channel encoding to output an encoded bit stream for transmission. The baseband processing of data can include signal processing of the encoded bit stream by Fourier transforms (e.g., discrete Fourier transforms, inverse fast Fourier transforms) and filtering to generate symbols which are provided to front-end filters for upconversion and transmission.

The radio nodes 120 also include a radio resource manager (RRM) 124 that controls a number of scheduling entities, a number of physical resource blocks, and/or a throughput in the cells 102. The throughput can be controlled by regulating transmit power, modulation scheme, error coding scheme, etc., used for communications with the UEs 110.

Capacity of the baseband processing component 122 can be defined by the maximum number of scheduling entities (SE), the maximum number of scheduled PRBs, and/or the maximum throughput that the baseband processing components 122 can provide in a TTI. In accordance with some embodiments, the radio resource manager 124 controls a number of scheduling entities, a number of physical resource blocks, and/or a throughput in the cells 102 based on a capacity target determined for the baseband processing component 122. The capacity target is dynamically determined for each TTI based on a deadline margin that is measured between when baseband processing completed and a deadline for completion of the baseband processing.

Various embodiments are disclosed in the context of a LTE communication system, such as the system 100 of FIG.

1, for ease of illustration and explanation only. However, the invention is not limited thereto as it may be embodied in other types of communication systems.

Controlling Capacity Based on Baseband Processing Deadline Margin

Figure 2:
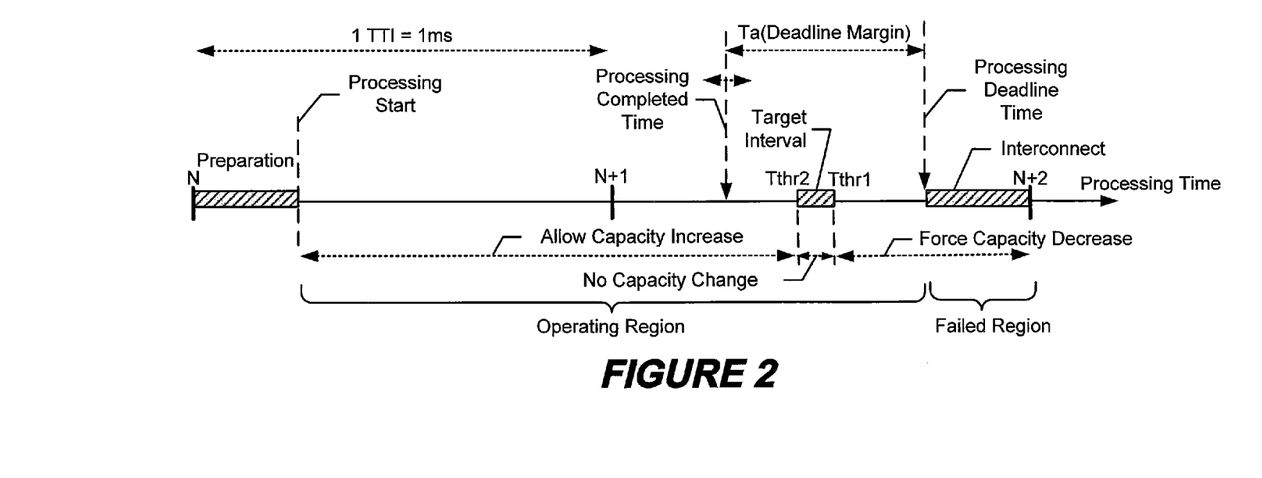
FIG. 2 illustrates a timeline of events and associated operations by a radio node of the communications system of FIG. 1 in accordance with some embodiments.

FIG. 2 illustrates a timeline of events and associated operations by the radio node 120 of the communications system 100 of FIG. 1 in accordance with some embodiments. In some embodiments, the baseband processing component 122 operates to determine a baseband processing capacity target for a cell 102 based on a baseband processing deadline margin it determined. Some of the operations disclosed herein as being performed by the baseband processing component 122 may instead be performed by the radio resource manager 124 or another component of the system 100.

Referring to FIG. 2, the baseband processing component 122 determines a "deadline margin" (Ta) for a TTI based on a difference between a time when the baseband processing component 122 completed baseband processing of data for transmission ("processing complete deadline) and a defined "processing deadline time" for completion of the baseband processing, in order to meet requirements for transmitting the baseband processed data at a defined time in one of the cells 102. If the baseband processing operations cannot be completed before the processing deadline time, the data must be discarded without being transmitted (indicated by the "failed region" on the timeline).

The processing completed time can vary between TTIs as the communication requirements of the cell 102 dynamically varies which, in turn, has a corresponding variable loading on the baseband processing resources. The processing deadline time can be defined based on how much time is needed to "interconnect" the radio node 120 to one of the UEs 110 to begin transmission of the data. The timeline also illustrates a "preparation" time duration during which data is prepared for baseband processing, and a "processing start" time when baseband processing by the baseband processing component 122 begins.

Capacity of baseband processing resources allocated to a cell 102 for a next occurring TTI is controlled based on the deadline margin (Ta) and a desired capacity. When the deadline margin (Ta) is determined to be less than a first threshold (Tthr1), the capacity of baseband processing resources allocated for processing data for transmission in the cell 102 may be decreased. In contrast, when the deadline margin (Ta) is determined to be greater than a second threshold (Tthr2), the capacity of baseband processing resources allocated for processing data for transmission in the cell 102 may be increased. Example operations for increasing and decreasing the capacity are explained below in connection with FIG. 3. When the deadline margin (Ta) is determined to be greater than the first threshold (Tthr1) and less than the second threshold (Tthr2), the capacity of baseband processing resources allocated for processing data for transmission in the cell 102 may be allowed to remain the same.

A "target interval" on the timeline is illustrated on the timeline of FIG. 2 between a first threshold (Tthr1) time and a second threshold (Tthr2) time. The capacity can be adjusted when the processing completed time occurs outside the target interval. In contrast, the capacity can remain constant when the processing completed time occurs within the target interval.

The first threshold (Tthr1) can be defined to provide a sufficient margin before the processing deadline time to enable the baseband processed data to be ready for transmission before the processing deadline time. The second threshold (Tthr2) can be defined based on a balance between satisfying the sufficient margin before the processing deadline time while providing a desired utilization of available baseband processing resources and capacity within one or more of the cells 102. Use of two different thresholds (Tthr1 and Tthr2) also avoids occurrence of oscillations between the decisions, i.e., a decision to decrease capacity in one TTI followed by a decision to allow capacity to increase capacity in a next TTI and vice versa.

Figure 3:
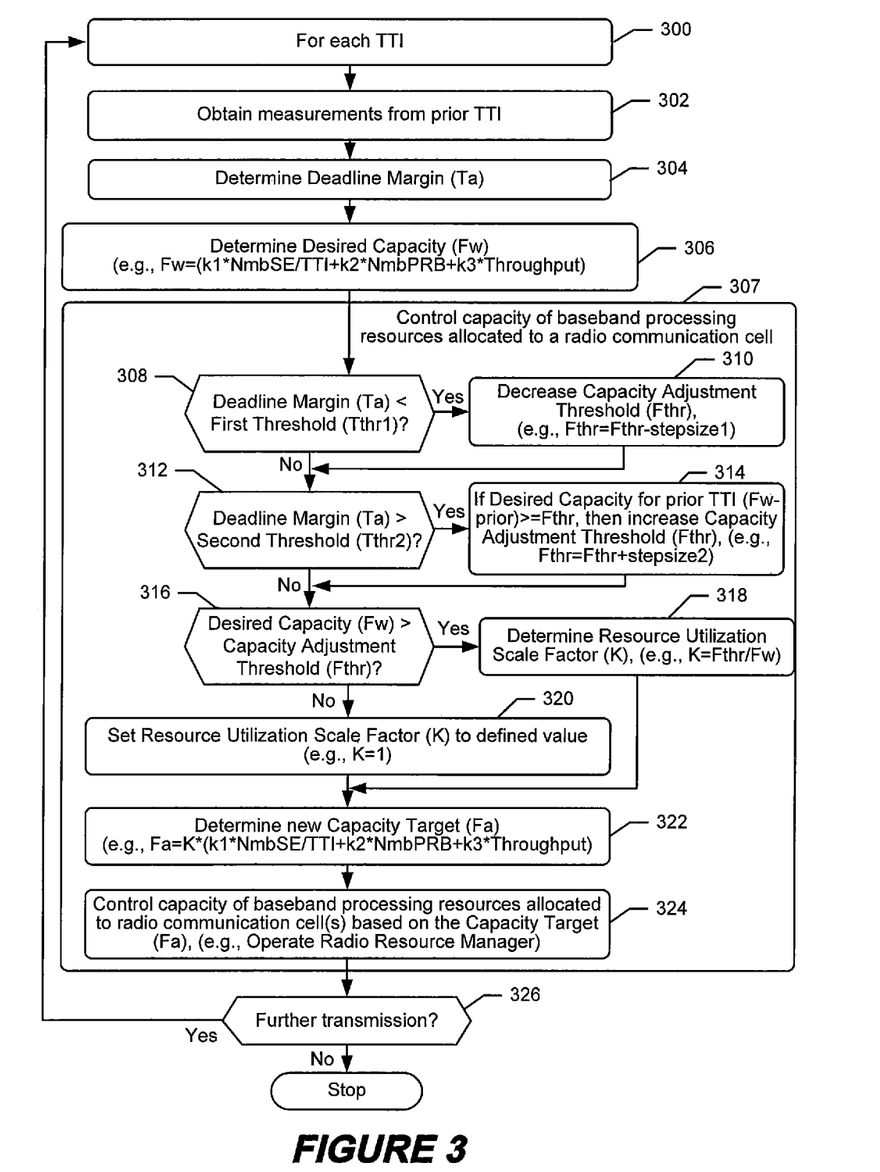
FIG. 3 is a flowchart of methods and operations by a radio node of the communications system of FIG. 1 in accordance with some embodiments.

Methods and Operations for Allocating Baseband Processing Capacity to Cells Based on Baseband Processing Deadline Margin FIG. 3 is a flowchart of methods and operations by the radio nodes 120 of the communications system 100 of FIG. 1 in accordance with some embodiments. These operations may be performed by the baseband processing component 122, by the radio resource manager 124, and/or by another processing component of the system 100.

Referring to FIG. 3, the illustrated operations are repeated (block 300) for each TTI during which data is to be transmitted. The operations include obtaining (block 302) measurements from a prior TTI, which are used to determine (block 304) a deadline margin (Ta) based on a difference between a time when baseband processing of data for transmission completed and a defined deadline time for completion of the baseband processing. A desired capacity (Fw) of baseband processing resources to allocate to the cell for a present TTI is determined (block 306).

Figure 4:
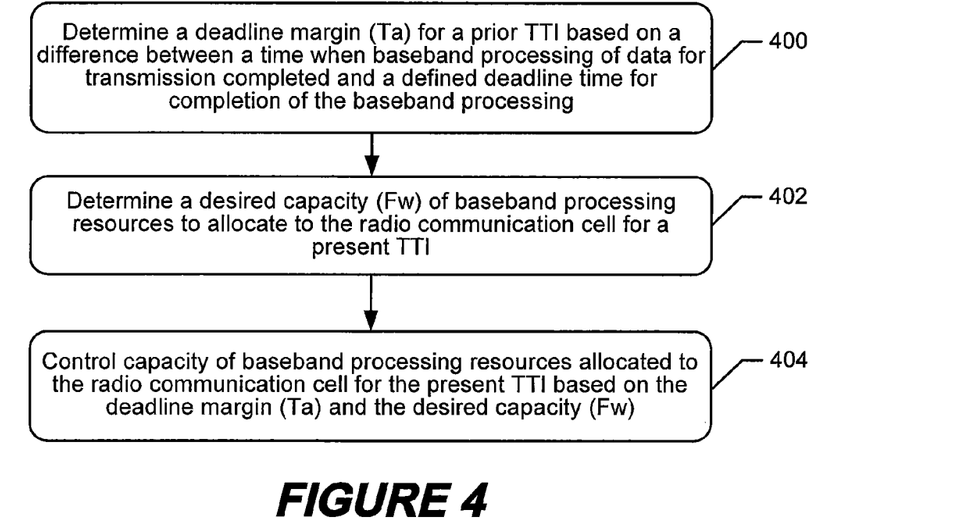
FIGS. 4-6 are flowcharts of alternative or additional methods and operations by a radio node of the communications system of FIG. 1 in accordance with some embodiments.

FIG. 4 illustrates example operations for determining (block 306) the desired capacity (Fw). Referring to FIG. 4, a desired number of scheduling entities (NmbSE) for the cell is determined (block 400). A desired number of physical resource blocks (PRBs) for the cell is determined (block 402). A desired throughput (Throughput) for the cell is determined. Various defined scale factors are obtained from memory. For example, a scheduling entities scale factor is obtained (block 406), a NmbPRBs scale factor is obtained (block 408), and a throughput scale factor is obtained (block 410).

The desired capacity (Fw) of baseband processing resources to allocate to the cell for the present TTI is determined (block 412) based on the following equation:

$$Fw=(k1*\text{NmbSE}/\text{TTI}+k2*\text{NmbPRBs}+k3*\text{Throughput}).$$

It is noted that the desired capacity (Fw) may be determined based on other numerical combinations of one or more of the NmbSE/TTI, NmbPRBs, and Throughput.

In the equation, NmbSE/TTI is the desired number of scheduling entities for the cell, NmbPRBs is the desired number of physical resource blocks for the cell, Throughput is the desired throughput for the cell, k1 is the NmbSE/TTI scale factor, k2 is the NmbPRBs scale factor, and k3 is the throughput scale factor.

Although FIG. 4 illustrates that the desired capacity (Fw) is determined (block 412) based on a numerical combination of the desired number of scheduling entities (NmbSE), the desired number of physical resource blocks (PRBs), and the desired throughput (Throughput), some other embodiments of the present disclosure may determine the desired capacity (Fw) based on less information or other information.

Figure 5:
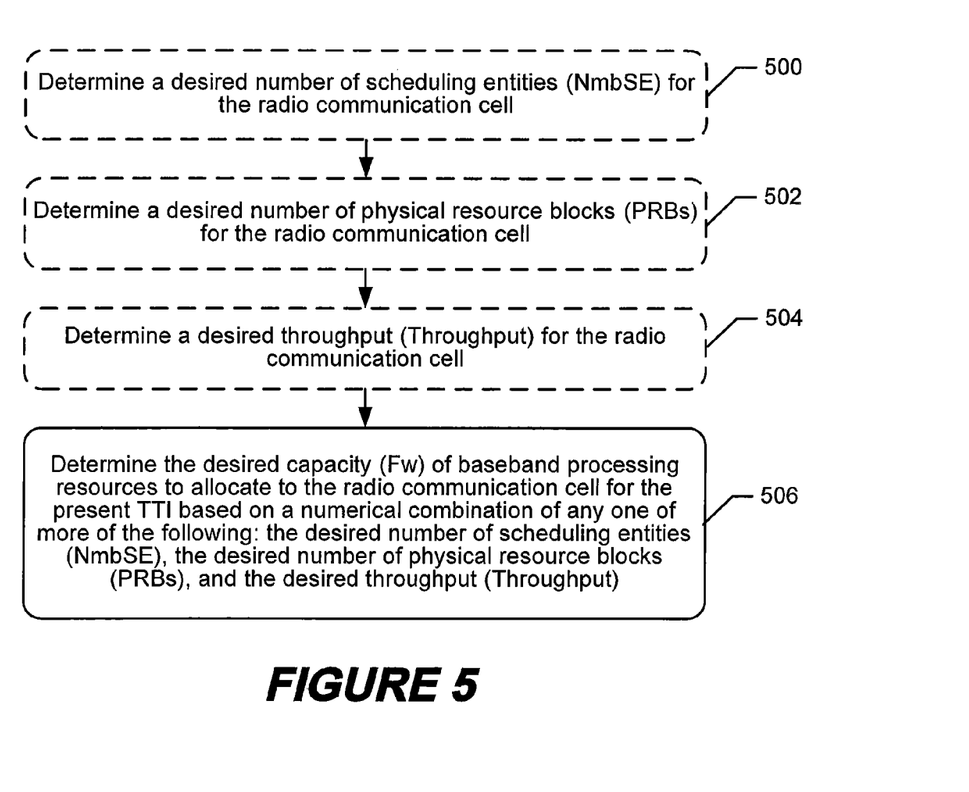

For example, FIG. 5 illustrates operations for determining (block 506) the desired capacity (Fw) based on possibly less information than used by the operations in FIG. 4. More particularly, the desired number of scheduling entities (NmbSE) may be determined (block 500). Alternatively or additionally, the desired number of physical resource blocks (PRBs) may be determined (block 502). Still alternatively or additionally, the desired throughput (Throughput) may be determined (block 504). The desired capacity (Fw) of baseband processing resources to allocate to the cell for the present TTI can then be determined (block 412) based on a numerical combination of the desired number of scheduling entities (NmbSE), the number of physical resource blocks (PRBs), and the desired throughput (Throughput), some other embodiments of the present disclosure may determine the desired capacity (Fw) based on a numerical combination of any one of more of the following: the desired number of scheduling entities (NmbSE), the desired number of physical resource blocks (PRBs), and the desired throughput (Throughput).

The capacity of baseband processing resources allocated to the cell for the present TTI is controlled (block 307) based on the deadline margin (Ta) and the desired capacity (Fw).

In the embodiment of FIG. 3, operations to control (block 307) the capacity of baseband processing resources include determining (block 308) whether the deadline margin (Ta) is less than the first threshold (Tthr1) and, if so, decreasing (block 310) a capacity adjustment threshold (Fthr). The operations further include determining (block 312) whether the deadline margin (Ta) is greater than the second threshold (Tthr2) and, if so, increasing (block 314) the capacity adjustment threshold (Fthr) only if the desired capacity (Fw) for a prior TTI (Fw_prior) is greater than or equal to the capacity adjustment threshold (Fthr). Increasing the capacity adjustment threshold (Fthr) only if the desired capacity (Fw) for the previous TTI (Fw_prior) is greater than or equal to the capacity adjustment threshold (Fthr) avoids increasing a capacity target (Fa), as explained below, when there are no presently connected users.

The capacity adjustment threshold (Fthr) may be decreased (block 310) by a defined first step size value, and may be increased (block 314) by a second step size value that is different than the first step size value. It may be preferable for the first step size value to be greater than the second step size value, so that the capacity of baseband processing resources is more rapidly decreased than increased, based on the further operation explained below with regard to blocks 316-324. More particularly, the risk of allocating insufficient baseband processing resource capacity to a cell is that an acceptable number of data transmission opportunities fail due to baseband processing not being completed before the processing deadline time. In contrast, the risk of allocating too much baseband processing resource capacity to a cell is that the baseband processing resources are not efficiently utilized.

These further operations include determining (block 316) whether the desired capacity (Fw) is greater than the capacity adjustment threshold (Fthr). The capacity of baseband processing resources allocated to the cell for the present TTI is then selectively adjusted (blocks 318-324) based on the comparison of the desired capacity (Fw) and the capacity adjustment threshold (Fthr).

For example, when the desired capacity (Fw) is greater than the capacity adjustment threshold (Fthr), a resource utilization scale factor (K) is determined (block 318) based on a ratio of the capacity adjustment threshold (Fthr) to the desired capacity (Fw). Otherwise, when the desired capacity (Fw) is less than the capacity adjustment threshold (Fthr), the resource utilization scale factor (K) is set (block 320) to one. A new capacity target (Fa) is then determined (block 322) based on a result of multiplication of the resource utilization scale factor (K) and the desired capacity (Fw), which can be represented by the following equation:

$$Fa = K(k1*\text{NmbSE/TTI} + k2*\text{NmbPRBs} + k3*\text{Throughput}).$$

The capacity of baseband processing resources allocated to the cell for the present TTI is controlled (block 324) based on the new capacity target (Fa). The new capacity target (Fa) can therefore include a target SE/TTI capacity, a target NmbPRB capacity, and/or a target Throughput capacity. The target SE/TTI capacity is determined based on K* (a desired number of scheduling entities for the radio communication cell). The target NmbPRB capacity is determined based on K*(a desired number of PRBs for the radio communication cell. The target Throughput capacity is determined based on K*(a desired throughput for the radio communication cell);

For example, the capacity target (Fa) and/or one or more of the associated target SE/TTI capacity, the target NmbPRB capacity, and/or the target Throughput capacity, can be used by the radio resource manager 124 to adjust the capacity of the cell and/or other cells which operate using the baseband processing resources of the baseband processing component 122. The radio resource manager 124 may, for example, regulate the number of scheduling entities in the cell, regulate the number of physical resource blocks allocated in the cell, and/or regulate the transmission throughput from the radio node 120.

The operations may determine (block 326) whether data remains buffered awaiting transmission and, if so, the operations can loop back to repeat for one or more further TTIs.

Figure 6:
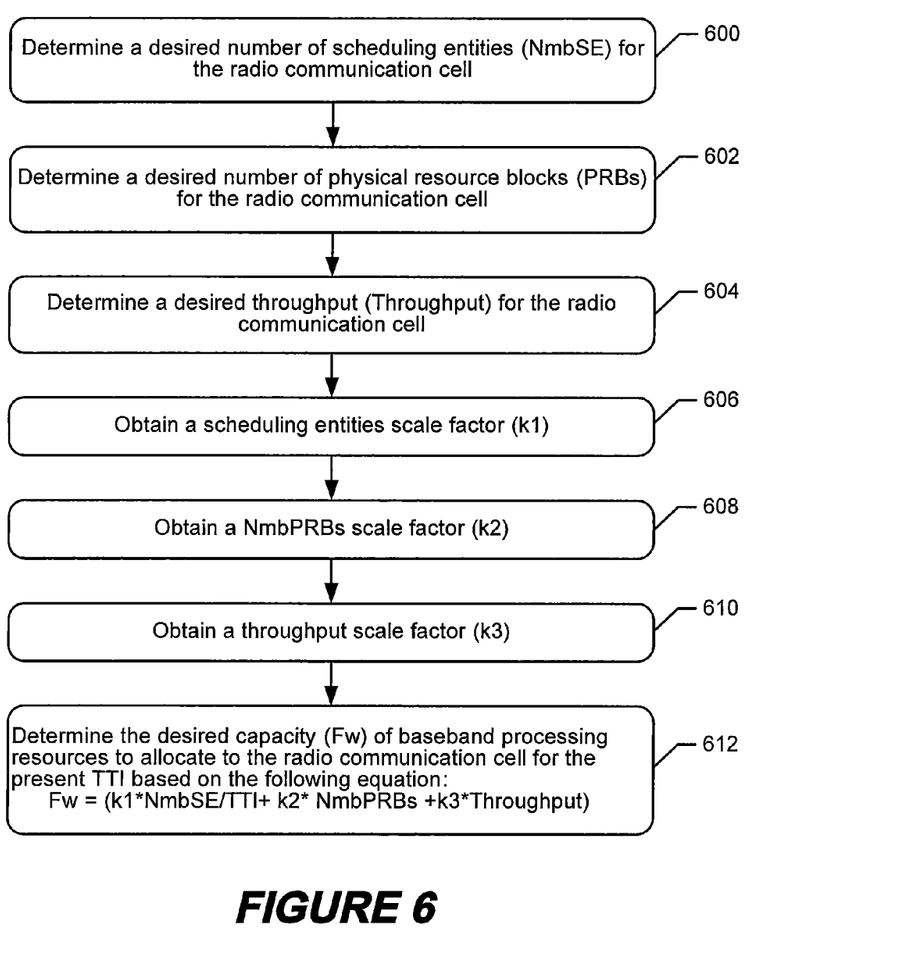

Although various embodiments for controlling capacity of baseband processing resources have been described in the context of the operations of FIGS. 3-5, other embodiments use more general operations. For example, FIG. 6 illustrates more general operations for controlling capacity of baseband processing resources. Referring to FIG. 6, a deadline margin (Ta) for a prior TTI is determined (block 600) based on a difference between a time when baseband processing of data for transmission completed and a defined deadline time for completion of the baseband processing. A desired capacity (Fw) of baseband processing resources to allocate to the cell for a present TTI is determined (block 602). The capacity of baseband processing resources allocated to the cell for the present TTI is controlled (block 604) based on the deadline margin (Ta) and the desired capacity (Fw).

A potential advantage of one or more of the embodiments disclosed herein is that the capacity targets will adapt to the current deployment and presently observed communication traffic. This can enable higher capacity and less tuning of constants used to set capacity limits. Baseband processing resources may be more efficiently utilized and the capacity of one or more cells serviced by the baseband processing resources can be more effectively managed.

Example User Equipment and Radio node

Figure 7:
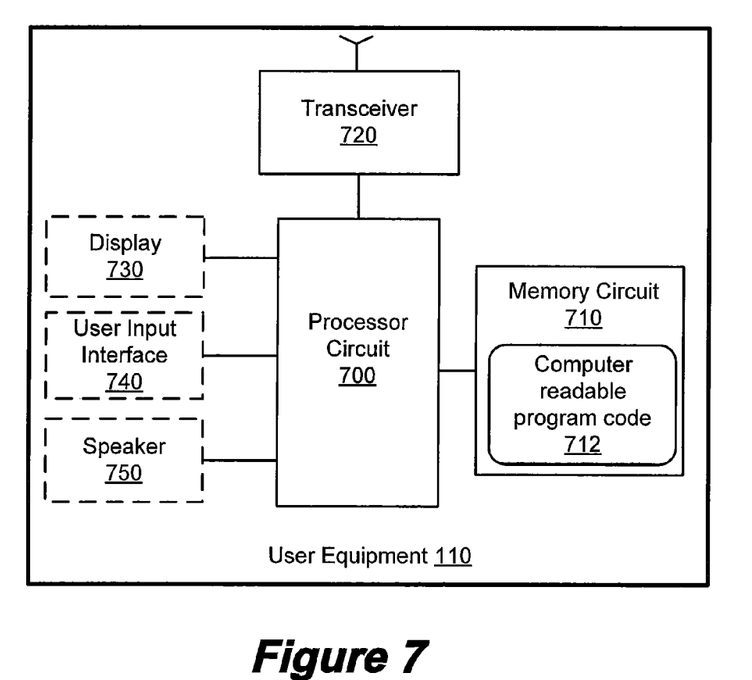
FIG. 7 is a block diagram of a user equipment of the communications system of FIG. 1 configured according to some embodiments.

FIG. 7 is a block diagram of a UE 110, for use in a telecommunications system, that is configured to perform operations according to one or more embodiments disclosed herein. The UE 110 includes a processor circuit 700, a transceiver 720, and a memory circuit 710 containing computer readable program code 712. The UE 110 may further include a display 730, a user input interface 740, and a speaker 750.

The transceiver 720 is configured to communicate with radio nodes through a wireless air interface using one or more of the radio access technologies disclosed herein. The processor circuit 700 may include one or more data processing circuits, such as a general purpose and/or special purpose processor, e.g., microprocessor and/or digital signal processor. The processor circuit 700 is configured to execute the computer readable program code 712 in the memory circuit 710 to perform at least some of the operations described herein as being performed by a UE.

Figure 8:
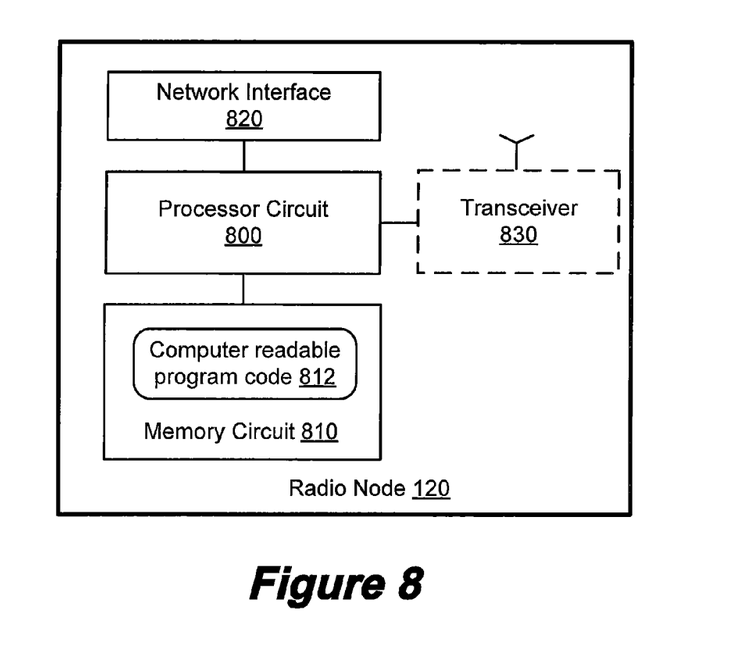
FIG. 8 is a block diagram of a radio node of the communications system of FIG. 1 according to some embodiments.

FIG. 8 is a block diagram of a radio node 120 that is configured according to one or more embodiments disclosed herein. The radio node 120 includes a network interface 820, a transceiver 830, a processor circuit 800, and a memory circuit 810 containing computer readable program code 812.

The transceiver 830 is configured to communicate with a UE 110 using one or more of the radio access technologies disclosed herein. The processor circuit 800 may include one or more data processing circuits, such as a general purpose and/or special purpose processor, e.g., microprocessor and/ or digital signal processor, that may be collocated or distributed across one or more networks. The processor circuit 800 is configured to execute the computer readable program code 812 in the memory 810 to perform at least some of the operations and methods of described herein as being performed by a radio node 120. The network interface 820 communicates with other radio nodes and/or the core network 140.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method by a radio unit for controlling capacity of baseband processing resources allocated to a radio communication cell, the method comprising:
   determining a deadline margin (Ta) for a prior transmission time interval, TTI, based on a difference between a time when baseband processing of data for transmission completed and a defined deadline time for completion of the baseband processing;
   determining a desired capacity (Fw) of baseband processing resources to allocate to the radio communication cell for a present TTI; and
   controlling capacity of baseband processing resources allocated to the radio communication cell for the present TTI based on the deadline margin (Ta) and the desired capacity (Fw).

2. The method of claim 1, wherein:
   the method of determining a deadline margin (Ta) for a prior transmission time interval, TTI, based on a difference between a time when baseband processing of data for transmission completed and a defined deadline time for completion of the baseband processing, comprises
      determining the deadline margins (Ta) across a plurality of radio communication cells; and
   determining a desired capacity (Fw) of baseband processing resources to allocate to the radio communication cell for a present TTI, comprises
      determining a desired capacity (Fw) of baseband processing resources to allocate to the radio communication cells; and
   the method of controlling capacity of baseband processing resources allocated to the radio communication cell for the present TTI based on the deadline margin (Ta) and the desired capacity (Fw), comprises
      controlling capacity of baseband processing resources allocated to the radio communication cells based on the deadline margins (Ta) across the radio communication cells and the desired capacity (Fw) determined for allocation to the radio communication cells.

3. The method of claim 1, wherein the method of determining a desired capacity (Fw) of baseband processing resources to allocate to the radio communication cell for a present TTI, comprises:
   determining a desired number of scheduling entities (NmbSE) for the radio communication cell;
   determining a desired number of physical resource blocks (PRBs) for the radio communication cell;
   determining a desired throughput (Throughput) for the radio communication cell; and
   determining the desired capacity (Fw) of baseband processing resources to allocate to the radio communication cell for the present TTI based on a numerical combination of the desired number of scheduling entities (NmbSE), the desired number of physical resource blocks (PRBs), and the desired throughput (Throughput).

4. The method of claim 1, wherein the method of determining a desired capacity (Fw) of baseband processing resources to allocate the radio communication cell for a present TTI, comprises:
   determining a desired number of scheduling entities (NmbSE) for the radio communication cell; and
   determining the desired capacity (Fw) of baseband processing resources to allocate to the radio communication cell for the present TTI based on a numerical combination of the desired number of scheduling entities (NmbSE).

5. The method of claim 1, wherein the method of determining a desired capacity (Fw) of baseband processing resources to allocate to the radio communication cell for a present TTI, comprises:
   determining a desired number of physical resource blocks (PRBs) for the radio communication cell;
   determining a desired throughput (Throughput) for the radio communication cell; and
   determining the desired capacity (Fw) of baseband processing resources to allocate to the radio communication cell for the present TTI based on a numerical combination of the desired number of physical resource blocks (PRBs) and the desired throughput (Throughput).

6. The method of claim 3, wherein the method of determining the desired capacity (Fw) of baseband processing resources to allocate to the radio communication cell for the present TTI based on a numerical combination of the desired number of scheduling entities (NmbSE/TTI), the desired number of physical resource blocks (NmbPRBs), and the desired throughput (Throughput), comprises: obtaining a scheduling entities scale factor; obtaining a NmbPRBs scale factor; obtaining a throughput scale factor; and determining the desired capacity (Fw) of baseband processing resources to allocate to the radio communication cell for the present TTI based on the following equation:Fw=(k1*NmbSE/TTI+k2*NmbPRBs+k3*Throughput), where: NmbSE/TTI is the desired number of scheduling entities for the radio communication cell, NmbPRBs is the desired number of physical resource blocks for the radio communication cell, Throughput is the desired throughput for the radio communication cell, k1 is the NmbSE/TTI scale factor, k2 is the NmbPRBs scale factor, and k3 is the throughput scale factor.

7. The method of claim 1, wherein the method of controlling capacity of baseband processing resources allocated to the radio communication cell for the present TTI based on the deadline margin (Ta) and the desired capacity (Fw), comprises:
   decreasing a capacity adjustment threshold (Fthr) based on the deadline margin (Ta) being less than a first threshold;
   increasing the capacity adjustment threshold (Fthr) based on the deadline margin (Ta) being greater than a second threshold and based on the desired capacity (Fw) for the prior TTI being greater than or equal to the capacity adjustment threshold (Fthr);

comparing the desired capacity (Fw) and the capacity adjustment threshold (Fthr); and selectively adjusting the capacity of baseband processing resources allocated to the radio communication cell for the present TTI based on the comparison of the desired capacity (Fw) and the capacity adjustment threshold (Fthr).

8. The method of claim 7,
wherein the first and second thresholds are different values; and
further comprising not changing the capacity adjustment threshold (Fthr) based on the deadline margin (Ta) being greater than the first threshold and less than the second threshold.

9. The method of claim 7, wherein:
the method of decreasing a capacity adjustment threshold (Fthr) based on the deadline margin (Ta) being less than a first threshold, comprises
decreasing the capacity of baseband processing resources allocated to the radio communication cell for the present TTI by a first step size value; and
the method of increasing the capacity adjustment threshold (Fthr) based on the deadline margin (Ta) being greater than a second threshold and based on the desired capacity (Fw) for the prior TTI being greater than or equal to the capacity adjustment threshold (Fthr), comprises
increasing the capacity of baseband processing resources allocated to the radio communication cell for the present TTI by a second step size value.

10. The method of claim 9, wherein:
the first step size value is greater than the second step size value.

11. The method of claim 7, wherein the method of selectively adjusting the capacity of baseband processing resources allocated to the radio communication cell for the present TTI based on comparison of the desired capacity (Fw) and the capacity adjustment threshold (Fthr), comprises:

based on the desired capacity (Fw) being greater than the capacity adjustment threshold (Fthr), determining a resource utilization scale factor (K) based on a ratio of the capacity adjustment threshold (Fthr) to the desired capacity (Fw);

determining a capacity target (Fa) based on a result of multiplication of the resource utilization scale factor (K) and the desired capacity (Fw); and controlling the capacity of baseband processing resources allocated to the radio communication cell for the present TTI based on capacity target (Fa).

12. The method of claim 11, wherein the method of selectively adjusting the capacity of baseband processing resources allocated to the radio communication cell for the present TTI based on comparison of the desired capacity (Fw) and the capacity adjustment threshold (Fthr), further comprises:

based on the desired capacity (Fw) being less than the capacity adjustment threshold (Fthr), setting the resource utilization scale factor (K) to one.

13. The method of claims 7, wherein the method of selectively adjusting the capacity of baseband processing resources allocated to the radio communication cell for the present TTI based on comparison of the desired capacity (Fw) and the capacity adjustment threshold (Fthr), comprises:

based on the desired capacity (Fw) being greater than the capacity adjustment threshold (Fthr), determining a resource utilization scale factor (K) based on a ratio of the capacity adjustment threshold (Fthr) to the desired capacity (Fw);

based on the desired capacity (Fw) being less than the capacity adjustment threshold (Fthr), setting the resource utilization scale factor (K) to one;

determining one or more of a target SE/TTI capacity based on K*(a desired number of scheduling entities for the radio communication cell), a target NmbPRB capacity based on K*(a desired number of PRBs for the radio communication cell), and a target Throughput capacity based on K*(a desired throughput for the radio communication cell); and controlling the capacity of baseband processing resources allocated to the radio communication cell for the present TTI based on the determined one or more of the target SE/TTI capacity, the target NmbPRB capacity, and the target Throughput capacity.

14. The method of claim 12, wherein the method of determining a desired capacity (Fw) of baseband processing resources to allocate to the radio communication cell for a present TTI, comprises:

determining a desired number of scheduling entities (NmbSE) for the radio communication cell;
determining a desired number of physical resource blocks (PRBs) for the radio communication cell;
determining a desired throughput (Throughput) for the radio communication cell;
obtaining a scheduling entities scale factor;
obtaining a NmbPRBs scale factor;
obtaining a throughput scale factor; and
determining the desired capacity (Fw) of baseband processing resources to allocate to the radio communication cell for the present TTI based on the following equation:

$$Fw=(k1*\text{NmbSE/TTI}+k2*\text{NmbPRBs}+k3*\text{Throughput}), \text{where:}$$

NmbSE/TTI is the desired number of scheduling entities for the radio communication cell,
NmbPRBs is the desired number of physical resource blocks for the radio communication cell,
Throughput is the desired throughput for the radio communication cell,
k1 is the NmbSE/TTI scale factor,
k2 is the NmbPRBs scale factor, and
k3 is the throughput scale factor.

15. A radio unit for controlling capacity of baseband processing resources allocated to a radio communication cell, the radio unit comprising:
at least one processor; and
at least one memory coupled to the at least one processor and comprising computer readable program code embodied in the at least one memory that when executed by the at least one processor causes the at least one processor to perform operations comprising:
determining a deadline margin (Ta) for a prior transmission time interval, TTI, based on a difference between a time when baseband processing of data for transmission completed and a defined deadline time for completion of the baseband processing;

determining a desired capacity (Fw) of baseband processing resources to allocate to the radio communication cell for a present TTI; and controlling capacity of baseband processing resources allocated to the radio communication cell for the present TTI based on the deadline margin (Ta) and the desired capacity (Fw).

16. The radio unit of claim 15, wherein the operation for determining a desired capacity (Fw) of baseband processing resources to allocate to the radio communication cell for a present TTI, comprises:

determining a desired number of scheduling entities (NmbSE) for the radio communication cell;

determining a desired number of physical resource blocks (PRBs) for the radio communication cell;

determining a desired throughput (Throughput) for the radio communication cell; and determining the desired capacity (Fw) of baseband processing resources to allocate to the radio communication cell for the present TTI based on a numerical combination of the desired number of scheduling entities (NmbSE), the desired number of physical resource blocks (PRBs), and the desired throughput (Throughput).

17. The radio unit of claim 15, wherein the operation for controlling capacity of baseband processing resources allocated to the radio communication cell for the present TTI based on the deadline margin (Ta) and the desired capacity (Fw), comprises:

decreasing a capacity adjustment threshold (Fthr) based on the deadline margin (Ta) being less than a first threshold;

increasing the capacity adjustment threshold (Fthr) based on the deadline margin (Ta) being greater than a second threshold and based on the desired capacity (Fw) for the prior TTI being greater than or equal to the capacity adjustment threshold (Fthr);

comparing the desired capacity (Fw) and the capacity adjustment threshold (Fthr); and selectively adjusting the capacity of baseband processing resources allocated to the radio communication cell for the present TTI based on comparison of the desired capacity (Fw) and the capacity adjustment threshold (Fthr).

18. The radio unit of claim 17, wherein the first and second thresholds are different values; and the operations further comprise not changing the capacity adjustment threshold (Fthr) based on the deadline margin (Ta) being greater than the first threshold and less than the second threshold.

19. The radio unit of claim 17, wherein:

the operation of decreasing the capacity adjustment threshold (Fthr) based on the deadline margin (Ta) being less than a first threshold, comprises decreasing the capacity of baseband processing resources allocated to the radio communication cell for the present TTI by a first step size value; and the operation of increasing the capacity adjustment threshold (Fthr) based on the deadline margin (Ta) being greater than a second threshold and based on the desired capacity (Fw) for the prior TTI being greater than or equal to the capacity adjustment threshold (Fthr), comprises increasing the capacity of baseband processing resources allocated to the radio communication cell for the present TTI by a second step size value.

20. The radio unit of claim 17, wherein the operation of selectively adjusting the capacity of baseband processing resources allocated to the radio communication cell for the present TTI based on comparison of the desired capacity (Fw) and the capacity adjustment threshold (Fthr), comprises:

based on the desired capacity (Fw) being greater than the capacity adjustment threshold (Fthr), determining a resource utilization scale factor (K) based on a ratio of the capacity adjustment threshold (Fthr) to the desired capacity (Fw);

based on the desired capacity (Fw) being less than the capacity adjustment threshold (Fthr), setting the resource utilization scale factor (K) to one;

determining a capacity target (Fa) based on a result of multiplication of the resource utilization scale factor (K) and the desired capacity (Fw); and controlling the capacity of baseband processing resources allocated to the radio communication cell for the present TTI based on capacity target (Fa).

21. The radio unit of claim 17, wherein the operation of selectively adjusting the capacity of baseband processing resources allocated to the radio communication cell for the present TTI based on comparison of the desired capacity (Fw) and the capacity adjustment threshold (Fthr), comprises:

based on the desired capacity (Fw) being greater than the capacity adjustment threshold (Fthr), determining a resource utilization scale factor (K) based on a ratio of the capacity adjustment threshold (Fthr) to the desired capacity (Fw);

based on the desired capacity (Fw) being less than the capacity adjustment threshold (Fthr), setting the resource utilization scale factor (K) to one;

determining one or more of a target SE/TTI capacity based on K*(a desired number of scheduling entities for the radio communication cell), a target NmbPRB capacity based on K*(a desired number of PRBs for the radio communication cell), and a target Throughput capacity based on K*(a desired throughput for the radio communication cell); and controlling the capacity of baseband processing resources allocated to the radio communication cell for the present TTI based on the determined one or more of the target SE/TTI capacity, the target NmbPRB capacity, and the target Throughput capacity.

22. The radio unit of claim 20, wherein the operation of determining a desired capacity (Fw) of baseband processing resources to allocate to the radio communication cell for a present TTI, comprises:

determining a desired number of scheduling entities (NmbSE) for the radio communication cell;

determining a desired number of physical resource blocks (PRBs) for the radio communication cell;

determining a desired throughput (Throughput) for the radio communication cell;

obtaining a scheduling entities scale factor;

obtaining a NmbPRBs scale factor;

obtaining a throughput scale factor; and determining the desired capacity (Fw) of baseband processing resources to allocate to the radio communication cell for the present TTI based on the following equation:

$$Fw=(k1*NmbSE/TTI+k2*NmbPRBs+k3*Throughput), \text{ where:}$$

NmbSE/TTI is the desired number of scheduling entities for the radio communication cell,
NmbPRBs is the desired number of physical resource blocks for the radio communication cell,
Throughput is the desired throughput for the radio communication cell,
k1 is the NmbSE/TTI scale factor,
k2 is the NmbPRBs scale factor, and
k3 is the throughput scale factor.

* * * * *